United States Patent [19]

Roth

[11] Patent Number: 4,620,821
[45] Date of Patent: Nov. 4, 1986

[54] CUTTING DEVICE FOR CUTTING HONEYCOMB LIGHT CONSTRUCTIONS

[75] Inventor: Dieter Roth, Zell-Harmersbach, Fed. Rep. of Germany

[73] Assignee: Prototyp-Werke GmbH, Zell a.H., Fed. Rep. of Germany

[21] Appl. No.: 651,698

[22] Filed: Sep. 14, 1984

[30] Foreign Application Priority Data

Sep. 21, 1983 [DE] Fed. Rep. of Germany ....... 3334165

[51] Int. Cl.[4] .............................................. B23D 61/02
[52] U.S. Cl. ........................................ 407/1; 83/854; 407/2; 407/30; 407/55
[58] Field of Search ................ 83/676, 835, 853, 854, 83/855, 150, 923; 407/1–6, 30, 53–57

[56] References Cited

U.S. PATENT DOCUMENTS

| 1,643,474 | 9/1927 | Simmons | 407/55 |
| 1,898,732 | 2/1933 | Krohne | 407/55 |
| 3,576,061 | 4/1971 | Pahlitzsch | 83/854 |
| 4,359,299 | 11/1982 | Sagarian | 407/62 |

FOREIGN PATENT DOCUMENTS

| 69086 | 6/1977 | Japan | 407/55 |
| 69087 | 6/1977 | Japan | 407/55 |
| 391919 | 10/1973 | U.S.S.R. | 83/854 |
| 523761 | 10/1976 | U.S.S.R. | 407/7 |
| 575176 | 10/1977 | U.S.S.R. | 407/2 |

Primary Examiner—Francis S. Husar
Assistant Examiner—Jerry Kearns
Attorney, Agent, or Firm—Michael J. Striker

[57] ABSTRACT

A cutting device for cutting thin-walled honeycomb profiles of metal or plastics for airplane technology includes a cutter which has sharply ground saw-shaped teeth at its periphery; the steep flanks of individual teeth extend opposite to the direction of rotation of the cutter.

39 Claims, 9 Drawing Figures

CUTTING DEVICE FOR CUTTING HONEYCOMB LIGHT CONSTRUCTIONS

BACKGROUND OF THE INVENTION

The present invention relates to a cutting device for cutting thin-walled multi-layer hollow profiles, such as honeycomb elements utilized, for example in airplane technology. Such cutting devices normally include a fast-running motor which carries at its shaft stump a cutting member.

Honeycomb elements which are glued in hollow chambers of various structural components to reinforce the latter have been up till now utilized in the airplane technology. These honeycomb elements are made of aluminum, paper or plastics and must, before being glued to respective structural components, be precisely adjusted to various shapes of those components of the airplane in order to also ensure that they would be able to take up required forces.

Cutting of such elements has been problematic because the formed laminations or sheets should never be buckled. Particularly if the elements must be cut transversely of its honeycomb structure cutting forces would deform the laminatious in the region of the cut. These profiles become, however curved or buckled and are unable to take up pulling or supporting forces over the entire periphery of the profile.

The cutting of such elements has been performed by conventional cutting arrangements which include either a circular saw blade or a rotary milling cutter. A very small stroke of the circumferential teeth of this tool for the chip removal resulted in cutting. Cutting forces required for removing chips from the workpiece are frequently so high that the honeycomb structure is not able to withstand them and becomes curved. Also known is the utilization of simple flat circular blades. The latter, however, do not produce a precise cut.

SUMMARY OF THE INVENTION

It is an object of the present invention to provide an improved cutting device for cutting thin-walled honeycomb elements.

It is a further object of this invention to provide a cutter which would ensure a fast and particularly harmless cutting of thin-walled light elements having a honeycomb structure.

These and other objects of the invention are attained by a cutting device for cutting light elements having a honeycomb structure, comprising a cutting member rotatable at a high speed and having a circumference and provided with a plurality of teeth at said circumference, said cutting member including a cutter having a sharp circumferential cutting edge and provided with said teeth at said edge, said teeth having tooth flanks extending in the direction of rotation, said flanks forming cutting edges which continually ascend in the direction opposite to the direction of rotation.

When light structural components of honeycomb structure have been cut up till now milling cutters or saws have been used. A rotating blade or cutter is suggested in the present invention, which has a sharp cutting edge by which by which scrap metal is separated from the workpiece to be used without chips to be dropped. Curving and buckling of the laminations of the elements being cut, even with a relatively strong stroke perpendicularly to the honeycomb structure are practically completely avoided. The cutting can be advantageously performed with the speed of 15,000 to 80,000 rpm. For many materials, for example plastics, the speed can be below 15,000 rpm.

The cutting device according to the invention is capable of making a number of successive short individual cuts instead of a continual cut made by the blade with a circular periphery.

By short, successive, quick cuts applied to the honeycomb structure favorable buckle-free cut surfaces of the laminations are produced. It is advantageous that all teeth of the cutter are easy to manufacture.

It is possible in principle to form symmetrical teeth of the cutter or with rounded tips so that the circumference of the cutter would be wave-shaped. In the proposed invention the teeth of the cutter are formed asymmetrically and also saw-tooth-shaped whereby steep flanks of the respective teeth ascend in the direction opposite to the direction of rotation of the cutter. This provides for much higher number of the cutting edges as compared to those known in practice.

The steep flanks may have breaking surfaces extended transversely of said cutting edges. The breaking surfaces may lie approximately in axial planes of said cutter.

The cutter may have about 10 to 30 teeth, preferably 12 to 20 teeth, so that it can be easily utilized for honeycomb structures of the elements used in the airplane technology.

The cutting member may be disc-shaped, said cutter having one end side and other end side and an axis of rotation. The cutter may have at said one side a plane normal to said axis of rotation, said cutting edges being limited at said one side by said plane and at said other side by conical surfaces steeply ascending towards a center of the cutter. The cutter may have a flat hollow having a conical surface at said one end side and concentrical with said axis, said cutting edges being limited at said one side by said conical surface and at said other side by conical surfaces steeply ascending towards a center of the cutter. Said cutter may have said one end side many flat hollows having conical surfaces which are rotation-symmetrical with said axis, said cutting edges being limited at said one end side by said conical surfaces and at said other end side by conical surfaces steeply ascending towards a center of the cutter. The cutter should be formed relative to the stub shaft such that a flat or conical surface of the cutting region of the cutter would face away from the motor. The connection nut for the cutter should not overlap the hollow or cavity formed at the front and of the cutter. The width of the cutter and therefore the width of individual teeth increases radially inwardly because the disc-shaped cutting member has the teeth extending radially outwardly.

The cutter can have a workpiece side and a waste material side. The flat or conical cavity or hollow at the front end face of the cutter provides that the smooth cut at the workpiece side is not influenced and also provides a relatively rapid increase in the thickness towards the back side of the cutter so that the cut-off material is formed away from the place of the cut and does not affect a further process.

The cutting edges can be, for example straight-line. Each of the cutting edges of this invention may have the shape of circular arc which has a radius corresponding to an outer radius of the cutter and a center point which is offset relative to a center point of the cutter. The arc of each cutting edge advantageously extends at right angle to the respective breaking surface. Due to the arc-shaped profile of the cutting edge the speed of the cutter, as seen in the stroke direction, gradually increases during each individual cutting step so that particularly small cutting forces in the direction of the stroke can be applied.

The strong increase in the thickness of the cutter also ensures that no low-frequency oscillations exert, which can have a negative effect on the quality of the cut. The cutting direction in the case of the flat construction must have small or no components in the direction of the axis of the tool towards the workpiece.

The breaking surfaces on the cutting edges may be elongated towards a center of the cutter. These breaking surfaces do not extend over the height of the flanks but, as mentioned, are elongated towards the center of the cutter so that the periphery of the cutter has a row of successive very deep teeth positioned one after another. The advantage of this construction resides in that the increase of the gradually widened teeth is extended towards the center of the cutter so that the cut-off material separated from the workpiece is forced away from the latter and its influence on the further cutting process is prevented.

An angle of ascending of the cutting edges in the direction opposite to the direction of rotation and relative to an axis extended through a respective cutting edge may be between 3° and 25°, preferably 10°.

Each cutting edge may be defined by two surfaces, an angle between said two surfaces in an axial plane of the cutter being 8°–25°, preferably between 10° and 16°.

The quality of the cut is further defined by a relative speed with which the circumference of the cutter is moved relative to a workpiece. The cutting device according to this invention is provided with means for controlling the cutting speed to make it possible to use the cutters of various diameters in the same cutting device.

As mentioned above the cutter has the shape which ensures that the cut-off material is deflected and forced away from the cutter. In order to further improve this action the cutting device is provided with a chip-deflecting member which is attached to the cutter at its backside. This chip-deflecting member may include a deflecting blade or deflecting cam surface which would form a continuation of the cutter.

According to a further feature of this invention the chip-deflecting member is formed as a rotation element which is coaxial with the cutter and mounted on the same rotary shaft with the cutter. Such chip-deflecting member ensures a continual transmittal of the chipped material from the cutter onto the chip-deflecting member and thereby excludes a negative action on the cutting process of the discontinual chip-deflection.

The chip-deflecting member has outer circumferential edges which at the sides facing towards said cutter substantially lie against said cutter; said chip-deflecting member has an outer diameter smaller than that of teeth tips of the cutter but greater than the diameter of the roots of the teeth of the cutter. The chip-deflecting member therefore engages a gap formed in the tool and ensures that material chips are forced away from the cutter right after the start of the cutting process so that no separated or broken particles of the material being cut can be seen at the location of the cut itself.

The chip-deflecting member may be a disc-shaped milling cutter. Such milling cutter further reduces the size of the chips, cut off from the workpiece by the cutter, in the immediate proximity of the cutter, and these further reduced particles can be sucked off or blown away from the tool. Furthermore, larger cut-off material pieces can be prevented from depositing on and folding into the honeycomb-shaped workpiece being cut. It could be defined by the direction of the course of the milling teeth whether the material is cut off or broken up. The disc-shaped milling cutter may have obliquely-extended cutting edges.

The milling cutter may have teeth having flanks which gradually ascend in the direction of rotation. Due to the arrangement of the cutting edges in relation with the direction of rotation and owing to the selection of the angle of obliquety of the teeth the guidance of the material chips and reaction of the milling cutter to a position of the cutter, material parameters and the like can be controlled.

The chip-deflecting member may be disc-shaped and may be formed with a smooth flute-shaped cavity extended in the direction of rotation. The cut-off material is not further cut or reduced in size in that cavity but is only deflected.

The chip-deflecting member may be a spur gear with inclined teeth. This spur gear or wheel is so manufactured that a spiral toothing is provided on the outer circumference of the cylindrical body of the gear. The spur gear with oblique teeth is very effective for reducing the chips in size and for guiding them away from the cut whereby no damage can be done to the surfaces of the cut.

A plurality of successive chip-breaking grooves may be formed in the teeth of the spur gear at the tooth tips. These grooves are oblique or spiral in the direction of rotation of the tool and have proven to be very effective.

The spur gear may have asymmetrical teeth with tooth tips which are offset in the direction of rotation and form the cutting edges. If the distance of the cutting edges from the axis of rotation, as seen in the direction of rotation, increases the distance of the tooth flank of each tooth from the respective cutting edge in the direction of rotation decreases.

Owing to the provision of asymmetrical teeth not only a favorable orientation of the cutting edges relative to the material cut off by the cutter is obtained but also a high rigidity of the teeth is provided.

According to still another feature of this invention the depth of the chip-breaking grooves formed in the chip-deflecting member does not exceed the height of the tooth tips and also the height of the portions of the teeth which are inclined to form the cutting edges.

The grooves in the chip-deflecting member may be formed by a fine thread which could be also a multiple thread, whereby the manufacture of the grooves is not only facilitated but also makes possible to form the pitch of the thread so that, upon the rotation of the tool, the material chips which are taken along by the chip-deflecting member, are engaged in the chip-breaking grooves and forced away from the cut.

The cutting member of this invention may be bell-shaped and may be hollow and have an outer surface having a frustoconical portion and a cylindrical portion, said cutter being formed on said frusto conical portion; the cutter may be formed with an inner conical rotation surface, said inner surface and said frustoconical portion merging into each other at a circumference of the cutter at an acute angle, said rotation surface having a series of outer flanks and a series of opositely lying inner flanks, said outer flanks and said inner flanks being respectively inclined to each other and to the circumference of the cutter such that they form cutting edges axially ascending in the direction opposite to the direction of rotation.

The outer rotation surface of the bell-shaped cutting member may be not only conical, but also cylindrical or curved. The inner rotation surface of the hollow cutting member limits the cavity or recess of the cutter and runs at an acute angle to a free edge of the outer rotation surface to form at the intersection of these surfaces a circular cutting edge. In operation such cutting member has no oscillations the frequency of which lies in the range of the oscillations of the cutting process.

The arrangement of individual cutting edges, and particularly of the breaking edges, is similar to that of the cutting edges of the disc-shaped cutting member with the difference that the cutting edges of the bell-shaped cutting member ascend axially in the direction of rotation and not radially as is the case in the disc-shaped cutter. The cutting edges do not extend precisely in the circumferential direction but are slightly inclined thereto, as seen in a radial direction, whereby the rear end of each cutting edge, which projects the greatest distance in the axial direction, lies precisely on the circumferential line of the tool whereas the front end of each cutting edge, as seen in the direction of rotation, is offset inwardly relative to the circumferential line of the tool.

The cutter according to the present invention operates according to a principle of a so-called line-milling cutter where the cutter travels back and forth along the line, and this line is displaced longitudinally until a desired surface on the workpiece is cut off. The axis of the cutter is slightly inclined in the direction of the stroke transversely of that line so that the middle of the cutter is not cut off.

The bell-shaped cutting member requires no individual chip-deflecting element because the outer and inner rotation surfaces serve as deflecting means for deflecting material chips away from the cutting edges of the cutter. It is possible to make cuts with the middle portion of the bell-shaped cutter as well as with a circumferential portion. It is possible to use the bell-shaped cutter to cut off three-dimensional curved surfaces of honeycomb structures, for example in the case if it is required to support from inside aerodynamic deformed portions of an airplane outer skin. The bell-shaped milling cutter has the advantage that the laminations of the honeycomb structure by no means will become curved, cracked or damaged and the honeycomb structure being cut will take up precisely defined loads.

The outer flanks of the cutting edges of bell-shaped cutting member may be substantially flat and extend parallel to an axial plane at said frusto conical surface portion or parallel to the tangential planes.

The outer rotation surface extends only over a portion of the length of the tool and a conical transition zone is provided between the outer rotation surface and a cylindrical portion of the tool.

Preferably the outer flanks lie in the planes which extend parallel to a neighboring tangential plane on the outer rotation surface; the inner flanks can be formed on the surface defining the inner rotation surface when curved cutting edges are desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
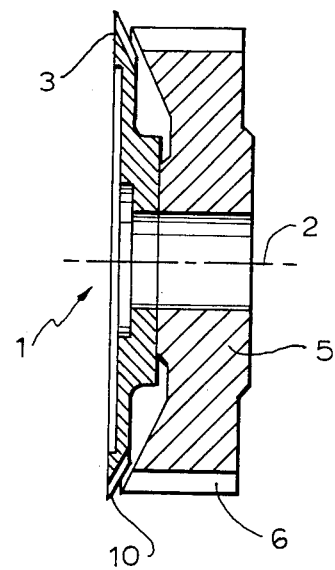
FIG. 1 is a sectional view of a cutter joined with a milling cutter formed as a deflecting device.

Referring now to the drawings more specifically the circular or disc-shaped cutting knife is designated by reference numeral 1. Reference numeral 2 identifies to central axis of the knife. Cutting knife or blade 1 is mounted in the known fashion on a rotating shaft of the cutting device.

Figure 4:
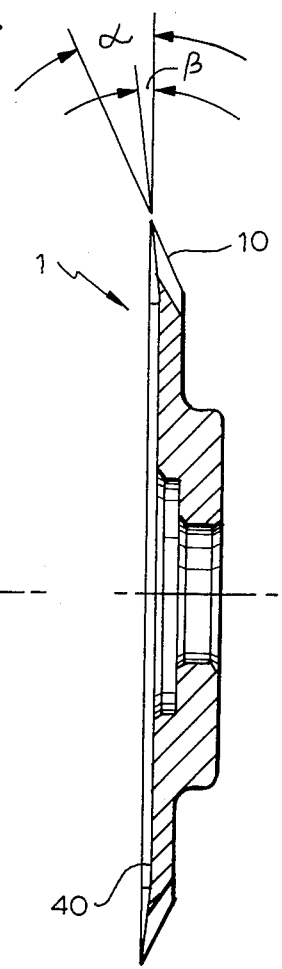
FIG. 4 is an enlarged axial view of the disc-shaped cutter of FIG. 1.

The cutter 1 has a diameter of 45 mm and has a free relatively flat hollow with a conical surface 40 which is formed at the front edge of the cutter and has a cone angle of, for example 170°. Accordingly, angle $\beta$ shown in FIG. 4 is, for example 5°. Centrally of the cutter the latter has a bore in which a shaft stump is received, which does not extend over a plane 3. A nut placed in the left-side central recess of the cutter serves for securing the cutter to the shaft.

Figure 3:
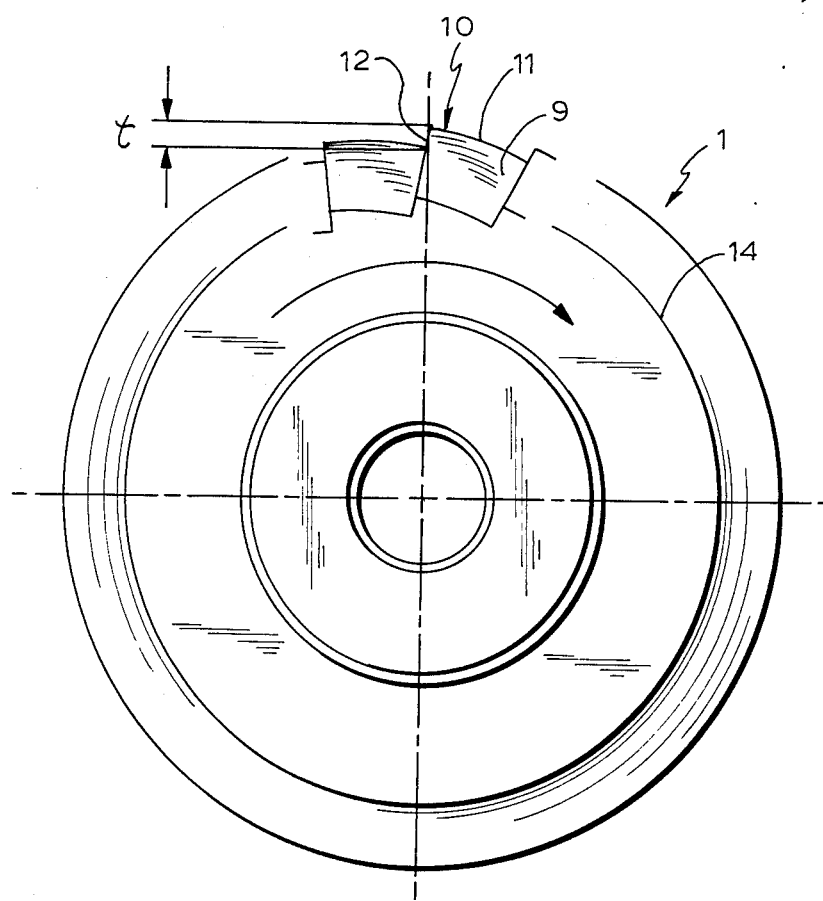
FIG. 3 is an enlarged rear view of the disc-shaped cutter of FIG. 1.

The cutter 1 has on the periphery thereof teeth 10 as clearly seen in FIG. 3. Teeth 10 have tooth flanks 9 which form in the direction of rotation a cutting edge 11 which lies laterally in the plane 3.

Figure 2:
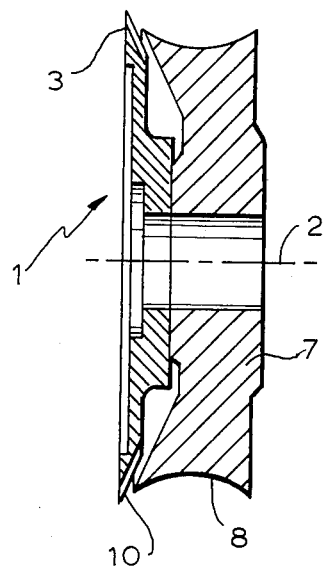
FIG. 2 is a sectional view of the cutter of FIG. 1 joined with a deflection roller as a deflecting device.

The right-side portion of the cutter 1 in the plane of FIGS. 1 and 2 ascends at the circumference of the cutter towards the side of the cutter with the cone angle of 140° so that angle $\alpha$ shown in FIG. 4 is 20°. The cutter 1 in its central region has at the side, facing away from front surface 3, an abutment support.

Adjoined to cutter 1 is a disc-shaped milling cutter 5 which is mounted on the same shaft with blade 1 and coaxially thereto. Cylindrical milling cutter 5 carries on the outer circumference milling teeth 6.

Cutter 5 lies immediately at the cutting blade 1 and has a frustoconical recess at its end surface so that the edges of milling teeth 6, facing towards the cutting blade 1 entirely or partially contact the adjacent flanks of cutting teeth 10. The outer circumference of milling cutter 5 is smaller than that of the cutting blade 1 but greater than a root line 14 of the cutting teeth 10.

Milling teeth 10 can run obliquely or spirally.

FIG. 2 shows the cutting blade similar to that of FIG. 1 but in conjunction with a deflecting roller 7 instead of disc-shaped milling cutter 5. This deflecting roller has the same structural and connection dimensions as the milling cutting 5. Deflecting roller 7 has on its circumference a hollow flute or channel 8 which has such a profile that upon a continual extension of the inner profile in the direction towards cutter 1 this extension cuts the tooth tips.

FIG. 3 shows the blade which is provided at its lateral side either with the milling cutter or deflecting roller 7, on which a drive, for example a pressure air motor with 15,000 rpm, is mounted.

The disc-shaped milling cutter which is shown herein has a diameter 45 mm and is provided with sixteen countersinks 9 so that sixteen teeth 10 are formed. Only two of these teeth are shown for the sake of simplicity. The depth of the tooth t is about 1.5 mm. The direction of rotation of blade 1 is shown by the arrow.

It is understandable that teeth 10 are formed as saw teeth whereby the edge of the cutter, gradually increasing over the tooth depth t, forms an arc and also forms a cutting edge 11 which lies in plane 3. Each cutting edge continually ascends in the direction opposite to the direction of rotation of the tool.

A second tooth edge 12 is right-angled to the cutting edge 11. Tooth edge 12 abruptly descends over the tooth depth t and is formed by one deflecting surface which is inclined by an angle about 10° to the connection between the cehtral axis 2 and the tip of tooth 10. The thickness of the tooth also increases with the rise of cutting edge 11 so that the tooth thickness is very small where a next tooth runs up in the direction of the arrow against the material being cut, the tooth thickness increasing at a uniform radial distance towards the central axis 2 so that, upon a continual penetration of the cutting edge into the material the cut-off material is pressed to the side due to the increasing tooth thickness.

The surfaces formed by tooth flanks 9 enclose with the end face 3 (FIG. 1) a cutting angle of about 20°. The outer surfaces of tooth flanks 9 and the intermediate region of the cutting edge 11 are fine ground. The radial extension of the tooth flank 9 is about 7 mm.

The disc-shaped milling cutter 5 preferably has the teeth which, simularly to the teeth of blade 1 have at their tooth flanks gradually increasing tooth thickness or tooth height in the direction of movement of the milling cutter. The ground milling cutter or chip breaker has twelve teeth and may have either the right spiral thread or the left spiral thread.

Flute or recess 8 of the deflecting roller 7 preferably has a radius of about 10 mm and extends at its side facing the blade 1 at an angle of 20° to the radial plane. The diameter of the deflecting roller or the milling cutter is preferably from 3 to 5% smaller than the diameter of cutter 1. The tooth thickness of the teeth of milling cutter 5 is about 4.5 mm. The above dimensions have proven to be advantageous by test results. The above-described tool despite its outstanding action can be manufactured with comparatively small expenses.

Figure 5:
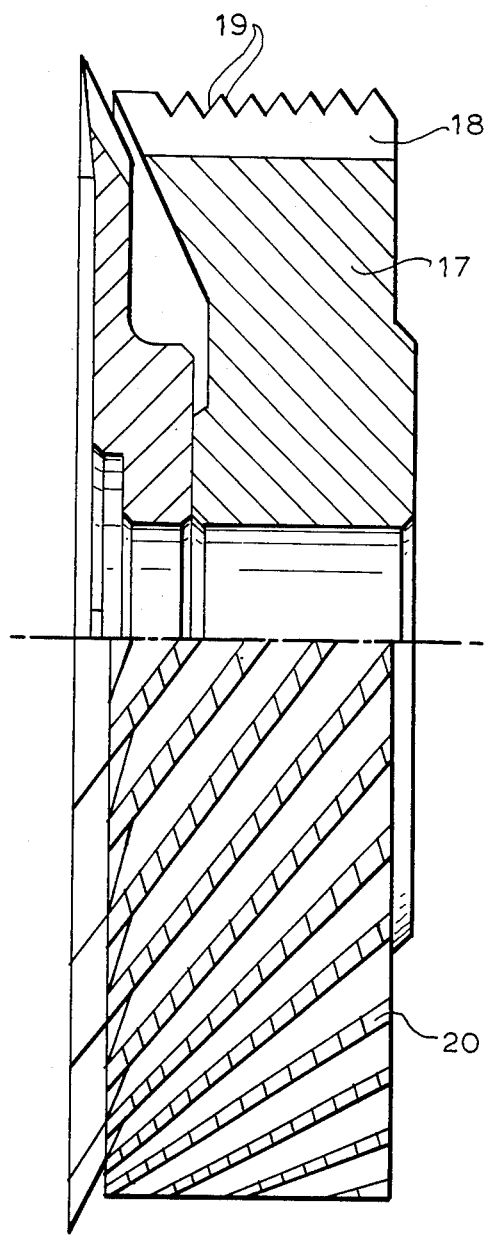
FIG. 5 is a sectional view of the cutter of FIG. 1 in conjunction with a spiral or toothed spur gear formed as a deflecting device.

FIG. 5 illustrates another embodiment of a chip-deflecting member 17 the whole shape and dimensions of which correspond to those of the deflecting member 5 of FIG. 1 and deflecting member 7 of FIG. 2. The deflecting member 17 of FIG. 5 is a cylindrical element which is a spur gear and has instead of milling cutting teeth 6 of milling cutter 5 spirally or obliquely extending teeth 18. A fine thread 19 is cut in the outer circumference of the spirally or obliquely extending teeth of deflecting member 17, this fine thread forming chip-breaking grooves. The depth of chip-breaking grooves 19 is about one fourth of the depth of each tooth 18.

The teeth lying at the front flanks in the direction of rotation as shown by the arrow in FIG. 3 abruptly or steeply descend towards the tooth foot whereas the teeth lying at the rear flanks descend relatively smoothly. Thereby the steeply-descending tooth face extends towards the outer periphery of the deflecting member whereas the rear-side tooth flank merges into the inclined ground surface 20 which ends at the tooth cutting edge. The basic structural dimensions and attachment dimensions of the deflecting number 17 for attaching to the cutter 1 correspond to those described for FIGS. 1 and 2. The fine thread which forms chip-breaking grooves 19 has a portion of, for example 1-2 mm. Deflecting member 17 has 30 obliquely-extending teeth.

Figure 6:
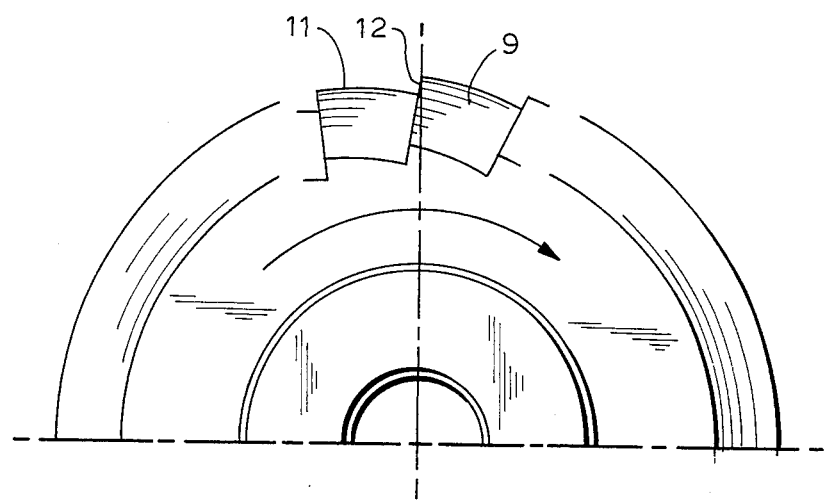
FIG. 6 is the rear view view in portion, of the cutter of FIGS. 3 and 4 with the two-side breaking surfaces.
Figure 7:
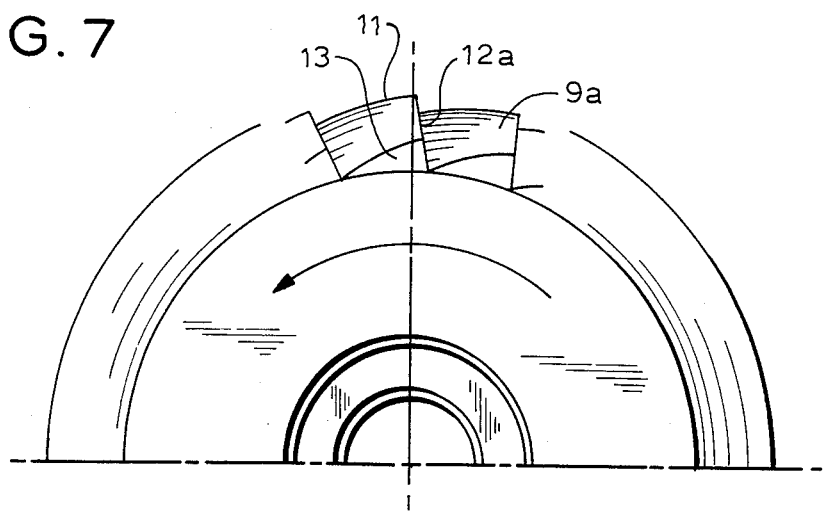
FIG. 7 is a rear view of FIG. 6.

The circular cutter shown in FIGS. 6 and 7 is distinguished from the cutter depicted in FIG. 3 in that besides tooth flanks 9 produced on the individual teeth on the conical front surface of the cutter, similar flanks are also provided on the back side of the cutter. Flanks 9a which are formed on the underside or backside of the cutter are shown in FIG. 7. Therefore as seen in FIGS. 6 and 7 both sides of the cutter 1 are provided with flanks. Breaking edges 12 and 12a also extend at both sides of the cutter 1, these breaking edges forming the corresponding guiding breaking surfaces leading to a next tooth of the cutter. In this embodiment similarly to the embodiment of FIG. 4 a somewhat rectangular region 13 is limited by each inner hollow conical surface of the respective tooth.

According to FIGS. 6 and 7 flanks 9 are provided from above and flanks 9a, extended in the same direction, are provided from below whereby in this construction, when the inclination of the flanks remains unchanged, the cutting edge 11 ascends stronger than in the construction according to FIGS. 3 and 4.

Figure 8:
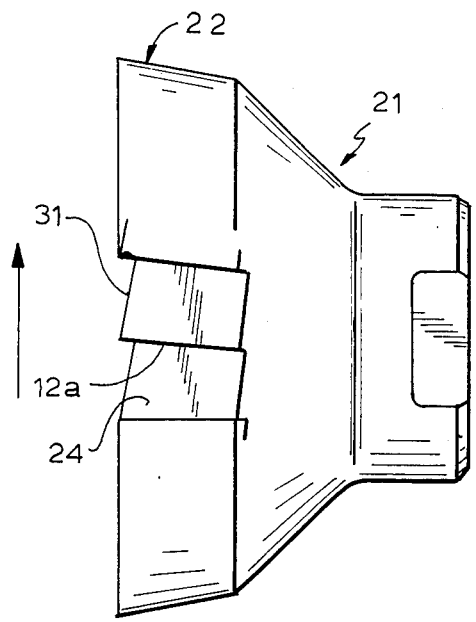
FIG. 8 is a side view of a bell-shaped cutter according to another embodiment of the invention.
Figure 9:
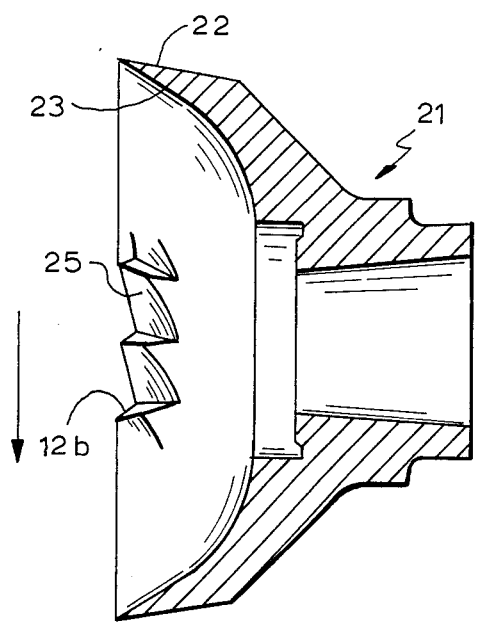
FIG. 9 is a sectional view through the cutter of FIG. 8.

FIGS. 8 and 9 illustrate still another embodiment of the invention, in which the cutter 21 has the shape of the bell. The outer contour of the cutter 21 is defined by a very steep frustoconical surface 22 which starts at the free cutting end of the tool and extends over about 15 mm in the axial direction of the cutter. The average angle of the extension of this frustoconical surface is about 20°. The rear edge of the portion defined by frustoconical surface 22 is joined with a flat conical transition portion which forms a tapering of the tool towards its shaft.

Near its front edge has the cutter 21 an inner rotation surface 23 which is dish-shaped, this surface at the front end of the cutter cutting into the frustoconical surface 22 thus forming a sharp edge. Cutting edges 31 are formed by this sharp edge.

An inner flank 25 which is inclined relative to the inner rotation surface 23 and an outer flank 24 which is formed in substantially one plane which is parallel to the tangential plane of the frustoconical surface 22, so that this targential plane is formed at one location which, as seen in the direction of rotation, lies around a small angular region before the flank 24. Thereby flank 24 is inclined to the circumferential direction in such a manner that the front end of the cutting edge 31 limited by flank 24 lies within the circumference whereas the rear end of this edge lies on the circumference. The rear end of the cutting edge lies exactly on the circumference whereas the front end is axially rearwardly offset relative to the rear end.

Outer and inner flanks following one after another are offset towards the following tooth by the outer breaking surface 12a and the inner breaking surface 12b.

It will be understood that each of the elements described above, or two or more together, may also find a useful application in other types of cutting devices for cutting honeycomb structures differing from the types described above.

While the invention has been illustrated and described as embodied in a cutting device for cutting honeycomb structures, it is not intended to be limited to the details shown, since various modifications and structural changes may be made without departing in any way from the spirit of the present invention.

Without further analysis, the foregoing will so fully revesal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutting device for cutting light elements having a honeycomb structure, comprising a cutting member having a direction of rotation and means for connecting with a rotary drive source and having a circumference provided with a plurality of teeth extending around said circumference, said teeth having sharpened tooth flanks forming curved circumferential cutting edges which continually and gradually radially ascend in the direction opposite to the direction of rotation, each of said teeth also having a radially extending edge extending at right angles to said circumferential cutting edge, said radial edge forming a radial step between the flanks of adjacent teeth, and each of said teeth having a thickness in a direction normal to said radial direction which gradually increases in a direction radially inward of said to tooth flanks.

2. The device as defined in claim 1, wherein said flanks have breaking surfaces (12) extended transversely of said cutting edges.

3. The device as defined in claim 2, wherein said breaking surfaces (12) lie approximately in axial planes of said cutter.

4. The device as defined in claim 3, wherein said cutter has about 10 to 30 teeth.

5. The device as defined in claim 4, wherein said cutter has 12 to 20 teeth.

6. The device as defined in claim 3, wherein said cutting member is disc-shaped, said cutter having one end side and other end side and an axis of rotation.

7. The device as defined in claim 6, wherein said cutter has at said one side a plane normal to said axis of rotation, said cutting edges being limited at said one side by said plane and at said other side by conical surfaces steeply ascending towards a center of the cutter.

8. The device as defined in claim 6, wherein said cutter has a flat hollow having a conical surface at said one end side and concentrical with said axis, said cutting edges being limited at said one side by said conical surface and at said other side by conical surfaces steeply ascending towards a center of the cutter.

9. The device as defined in claim 6, wherein said cutter has at said one end side flat hollows having conical surfaces which are rotation-symmetrical with said axis, said cutting edges being limited at said one end side by said conical surfaces and at said other end side by conical surfaces steeply ascending towards a center of the cutter.

10. The device as defined in claim 8, wherein said breaking surfaces (12) are formed by raising steps at said one end side of the cutter.

11. The device as defined in claim 6, wherein each of said cutting edges has the shape of circular arc which has a radius corresponding to an outer radius of the cutter and a center point which is offset relative to a center point of the cutter.

12. The device as defined in claim 11, wherein said breaking surfaces are elongated towards a center of the cutter.

13. The device as defined in claim 12, wherein an angle of ascending of said cutting edges in the direction opposite to the direction of rotation and relative to an axis extended through a respective cutting edge is between 3° and 25°.

14. The device as defined in claim 13, wherein said angle is 10°.

15. The device as defined in claim 12, wherein each cutting edge is defined by two surfaces, an angle between said two surfaces in an axial plane of the cutter being 8°–25°.

16. The device as defined in claim 15, wherein said angle is between 12° and 16°.

17. The device as defined in claim 12, further including a chip-deflecting member for deflecting cut-off material, said chip-deflecting member being attached to said cutter at said other end side thereof.

18. The device as defined in claim 17, wherein said chip-deflecting member is arranged coaxially with said cutter and on a mutual rotating shaft therewith.

19. The device as defined in claim 18, wherein said chip-deflecting member has outer circumferential edges which at the sides facing towards said cutter substantially lie against said cutter, said chip-deflecting member having an outer diameter greater than that of teeth roots of the cutter but smaller than that of teeth tips.

20. The device as defined in claim 19, wherein said chip-deflecting member is a disc-shaped milling cutter.

21. The device as defined in claim 20, wherein said milling cutter has obliquely-extended cutting edges.

22. The device as defined in claim 21, wherein the milling cutter has teeth having flanks which gradually ascend in the direction of rotation.

23. The device as defined in claim 18, wherein said chip-deflecting number is disc-shaped and is formed with a smooth flute-shaped cavity extended in the direction of rotation.

24. The device as defined in claim 18, wherein said chip-deflecting member is a spur gear with inclined teeth.

25. The device as defined in claim 24, wherein said gear has asymmetrical teeth with tooth tips which are offset in the direction of rotation and form cutting edges.

26. The device as defined in claim 25, wherein a plurality of successive chip-breaking grooves are formed in said teeth of the spur gear at the tooth tips.

27. The device as defined in claim 27, wherein the depth of said grooves is such that it does not exceed the height of the tooth tips.

28. The device as defined in claim 27, wherein said grooves are formed by a fine thread.

29. The device as defined in claim 28, wherein said thread has a pitch, which is arranged relative to the direction of rotation such that the chip-breaking grooves forming a course of the thread drift from said cutting edges of the cutter upon rotation of the cutter.

30. The device as defined in claim 28, wherein with a given outer diameter of the spur gear the tooth depth of its teeth is about D/25, the number of the teeth of the gear is 25 to 50, the width of the gear is about D/3 and the pitch of the thread is about D/50.

31. The device as defined in claim 3, wherein said cutting member is bell-shaped.

32. The device as defined in claim 31, said cutting member being hollow and has an outer surface having a frustoconical portion and a cylindrical portion, said cutter being formed on said frustoconical portion, said cutter being formed with an inner conical rotation surface, said inner surface and said frustoconical portion merging into each other at a circumference of the cutter at an acute angle, said inner rotation surface having a series of outer flanks (24) and a series of oppositely lying inner flanks (25), said outer flanks and said inner flanks being respectively inclined to each other and to the circumference of the cutter such that they form cutting edges (31) axially ascending in the direction opposite to the direction of rotation.

33. The device as defined in claim 32, wherein the outer flanks (24) are substantially flat and extend parallel to an axial plane at said frustoconical surface portion (22).

34. The device as defined in claim 32, wherein the outer flanks (24) are substantially flat and extend parallel to a tangential plane at said frustoconical portion (22).

35. The device as defined in claim 32, wherein said cutting edges have ends lying in the direction of rotation within the circumference and other ends lying on the circumference.

36. The device as defined in claim 32, wherein said frustoconical portion is defined by a cone with an average angle of about 20°.

37. The device as defined in claim 32, wherein the outer flanks (24) extend over the entire length of said frustoconical portion.

38. The device as defined in claim 37, wherein said inner rotation surface encloses a cavity which has the length in an axial direction of the cutting member which is equal to the length of said frustoconical portion.

39. The device as defined in claim 38, wherein the length of said cavity is about 0.2 of the diameter of the cutting member at the circumference of said cutting edges.

* * * * *